United States Patent

Riebs et al.

[15] 3,668,509
[45] June 6, 1972

[54] POWER SUPPLY SYSTEM FOR AND METHOD OF ENERGIZING MULTIPLE LEVEL LOADS

[72] Inventors: Richard E. Riebs, Hales Corners; Curtis J. Kohlman, Milwaukee, both of Wis.

[73] Assignee: McGraw-Edison Company, Milwaukee, Wis.

[22] Filed: Feb. 11, 1971

[21] Appl. No.: 114,543

[52] U.S. Cl. ............................................321/18, 321/45 R
[51] Int. Cl. .........................................................H02m 3/28
[58] Field of Search..........................................321/2, 18, 45

[56] References Cited

UNITED STATES PATENTS 3,356,928  12/1967  Parrish.....................................321/18
2,763,771  9/1956   Bichsel............................219/131 WR
3,530,359  9/1970   Grist....................................321/18 X Primary Examiner—William M. Shoop, Jr.
Attorney—R. J. Falkowski

[57] ABSTRACT

A power supply for a direct current load that has two power level requirements senses the current requirements of the load and operates a high output inverter at high power requirements and a low output inverter at low power requirements. The high and low output inverters are designed for maximum efficiency in their respective power ranges and are connected through full wave rectifying bridges to the load. The high power inverter is maintained in an "off" position until the load current requirement is increased. Upon the increase in current, a sensing circuit and energy storage device activates a switch to energize the high power inverter to power the load as long as the current requirements remain above a selected level.

10 Claims, 1 Drawing Figure

PATENTED JUN 6 1972
3,668,509
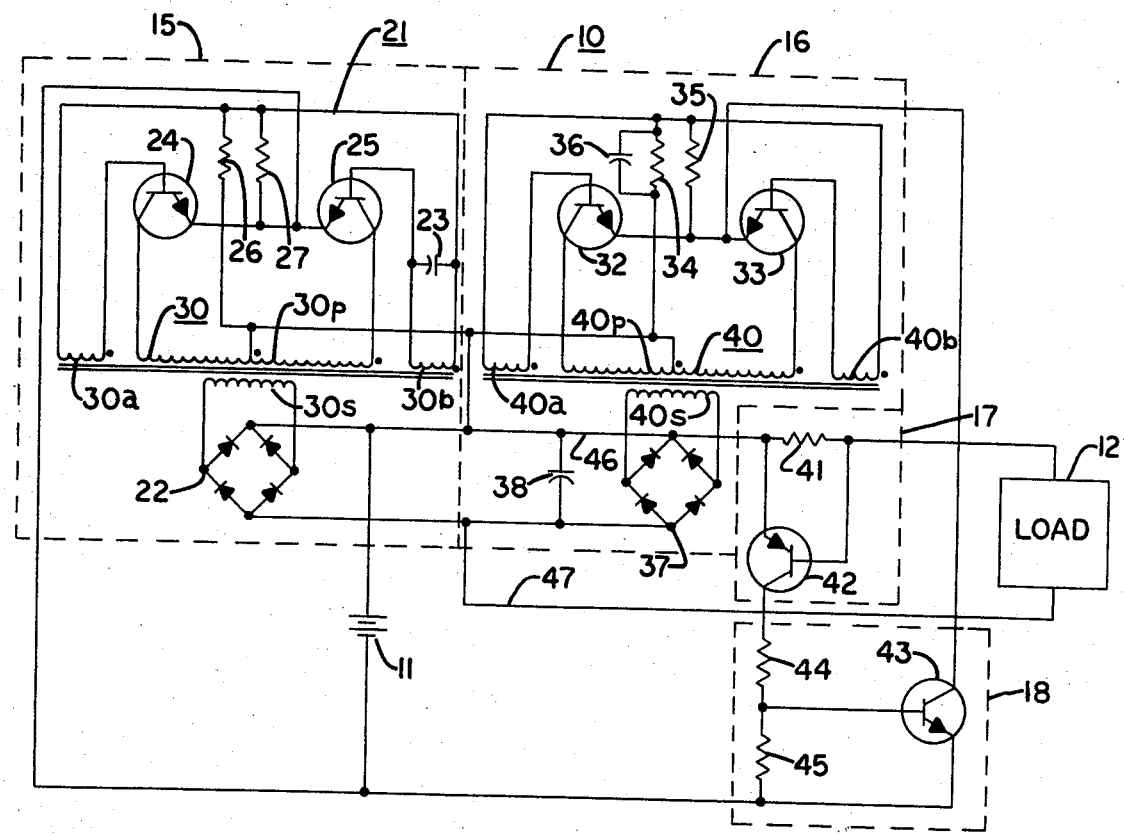
INVENTOR.
RICHARD E. RIEBS
CURTIS J. KOHLMAN
BY *R.J. Falbowski*
ATTORNEY

POWER SUPPLY SYSTEM FOR AND METHOD OF ENERGIZING MULTIPLE LEVEL LOADS

This invention relates to self-contained power supply systems, particularly to power supply systems having multiple inverters for powering loads having multiple level load requirements.

In many applications for remote self-contained power supplies it is often necessary to provide power over two or more ranges. Since the power supply is usually a device, such as a battery, having a limited life, it is usually desirable to provide power in the most efficient manner possible. For example, in certain applications, such as radio transmitter-receiver combinations operating from a self-contained prime power supply, the power requirements during the transmitting stage are very high and the power requirements during the receiving stage of operation are very low. Since direct current is required at a higher voltage level than is normally obtainable from a battery or similar power supply, inverters are used to obtain the desired voltage levels. However, if the range of power requirement is great, the efficiency of inverters suffers drastically at extremes of the power range with a resultant loss of power and significantly shortened battery life.

With this invention a simple, reliable circuit is provided that utilizes two inverters, each designed to operate efficiently at its respective power level, thereby conserving battery power. An accompanying control circuit switches operation of the high power inverter only during operation at high load requirements.

Other objects and advantages of this invention will be apparent from the following detailed description.

The FIGURE is a schematic drawing of a power supply circuit embodying this invention.

Referring to the FIGURE, a power supply system 10, powered by a battery 11, furnishes electrical power to a load 12. Load 12 may be any load, shown as a direct current load, that requires power at at least two significantly different levels at different times and, therefore, alternatively operates at a high power level and a low power level. A typical load would be a remotely located receiver and transmitter at which the transmitter would normally require about one hundred times the power of the receiver.

Power supply system 10 comprises a first power means such as a first low level converter 15; a second power means such as a second high level converter 16; a means for sensing current 17; a means for storing electrical energy, such as a capacitor 38; and a means for connecting high power converter 16 to battery 11, such as a switching means 18.

Low level converter 15 may be of any suitable known type and comprises a low level inverter 21 and a means for rectifying the inverter output, such as a full wave diode bridge rectifier 22. Low level inverter 21 comprises two low level switching transistors 24 and 25 selected for minimum cost and maximum efficiency at the required current levels in any known manner, appropriately selected bias resistors 26 and 27, a capacitor 23 for insuring starting of the inverter, and a transformer 30 connected and designed in any manner known in the art to provide efficient operation at the required current levels. Transformer 30 comprises a center tapped primary winding 30p, a feedback winding 30a, and a feedback winding 30b, each connected to respectively control switching transistors 24 and 25 to produce an output having substantially a square wave characteristic at a secondary winding 30s connected to diode bridge 22. Transformer 30 is of a type selected to have a small hysteresis loop of a substantially square configuration in order to have an efficient output at lower power levels.

High level converter 16 may be of any suitable known type and comprises power switching transistors 32 and 33 selected to efficiently handle the larger currents required for a greater output level, appropriate bias resistors 34 and 35, a capacitor 36 to insure starting the inverter under any conditions at energization, and a transformer 40 connected and designed in a manner known in the art to efficiently produce an output having a square wave characteristic. Transformer 40 comprises a center tapped primary winding 40p, feedback windings 40a and 40b connected to control switching transistors 32 and 33, respectively, an output secondary winding 40s, and a means for rectifying the output of winding 40s, such as a full wave diode bridge rectifier 37.

Means for sensing current 17 comprises a small shunt resistance 41 and a switching transistor 42 connected across resistance 41.

Capacitor 38 provides a means for storing electrical energy to supply energy during initial operation of the load at its high level and also is connected to smooth the output of rectifiers 22 and 37.

Switching means 18 comprises a switching transistor 43 and biasing resistors 44 and 45.

In the operation of the power supply when load 12 is operating from the power supplied by battery 11, it is either operating at a low level or a high level, typically, for a transmitter-receiver load, with a current requirement one hundred times greater at the high level as compared to the low level. Assuming that load 12 is operating at the low level from low level converter 15, as when operating as a receiver, low power converter 15 is operating and the rectified output from full wave rectifier 22 is applied along conductors 46 and 47 to load 12. The current supplied to the load causes a voltage to appear across shunt resistance 41. Resistance 41 and transistor 42 are selected so that, when the current through resistance 41 is at the lower current level, transistor 42 produces a first output when it is turned off, and at the high current level, transistor 42 produces a second output when it is turned on. With transistor 42 turned off, transistor 43 of switching means 18 is turned off because its base and emitter are at the same potential, and converter 16 is not connected to the negative terminal of battery 11 and is consequently not operating.

When load 12 switches from its low power operation to its high power operation, as by switching to a transmitting function, the voltage across resistance 41 increases. Since the power capabilities of low power converter 15 are not sufficient to activate sensing means 17 by turning on transistor 42, capacitor 38 is selected to store electrical energy during operation at a level sufficient to turn on transistor 42 long enough to start the operation of high power converter 16. When transistor 42 turns on biasing resistors 44 and 45 are connected to the battery and this connects the base of switching transistor 43 to a higher potential level and forward biases transistor 43 to turn it on. With transistor 43 turned on, the negative terminal of battery 11 is connected to high power converter 16 to energize converter 16 and thereby load 12. The current provided from power converter 16 maintains sufficient voltage drop across resistance 41 and provides sufficient power to keep transistor 42 turned on.

When the load requirements of the load change to a low level, as when the load switches to a receiving function from a transmitting function, the voltage across shunt resistor 41 drops sufficiently to remove the forward bias from transistor 42 to turn it off. This turns off switching transistor 43, and power converter 16 is disconnected from battery 11.

We claim:

1. A power supply system comprising:
   a load alternatively operable at a high power level and at a low power level;
   an electrical power source;
   a first power means for converting electrical power from the power source to energize the load operating at a low power level;
   a second power means for converting electrical power from the power source to energize the load operating at a high power level;
   a sensing means for sensing the power level of operation of the load to produce an output indicating the level of operation of the load;
   a switching means responsive to the output for connecting the second power means to be energized from the power source when the load is operating at a high power level and for disconnecting the second power means from the source when the load is operating at a low power level; and an energy storage means connected to be energized by the first power means for storing electrical energy received from the operation of said first power means at a level sufficient to operate the sensing means upon initial operation of the load at its high power level.

2. A power supply system according to claim 1 wherein said energy storage means comprises a capacitor connected between the first power means and the sensing means and connected to store electrical energy at said level during operation of said first power means.

3. A power supply system according to claim 1 wherein said switching means comprises a switching transistor connected between the battery and the second power means and connected to respond to the sensing means transistor to turn on when said sensing transistor is turned on and to turn off when said sensing transistor is turned off.

4. A power supply system according to claim 1 wherein said sensing means comprises a shunt resistance connected between the first power means and the load and a transistor connected to sense the voltage across the shunt resistance to turn on when the voltage exceeds a preselected level and to turn off when said voltage is below a preselected level.

5. A power supply system according to claim 4 wherein said energy storage means comprises a capacitor connected between the first power means and the sensing means and connected to store electrical energy for operation of the transistor.

6. A power supply system according to claim 5 wherein said switching means comprises a switching transistor connected between the battery and the second power means and connected to respond to the sensing means transistor to turn on when said sensing means transistor is turned on and to turn off when said sensing means transistor is turned off.

7. A power supply system comprising:
a direct current power source;
a direct current load alternatively operable at a high current level and at a low current level;
a low level converter adapted and connected to provide power to the load during its low current level operation and connected to be energized by the battery;
a high level converter adapted to provide power to the load during its high current level operation;
a sensing means comprising a shunt resistance connected between the converters and the load for sensing the current to the load and a transistor connected to sense the voltage across the shunt resistance to produce a first output when the voltage is below a preselected level and to produce a second output when said voltage exceeds a preselected level;
a switching means responsive to the outputs for connecting the battery to energize the high power converter in response to the second output and for disconnecting the battery from the high power converter in response to the first output; and
an energy storage means for storing electrical energy received from the operation of the low level converter at a level sufficient to provide sufficient current through the shunt resistance to turn on the transistor upon initial operation of the load at a high current level.

8. A power supply system according to claim 7 wherein said energy storage means comprises a capacitor connected between the low power converter and the shunt resistance and connected to store electrical energy during operation of the low power converter.

9. A power supply system according to claim 8 wherein said switching means comprises a switching transistor connected between the battery and the high level converter and connected to respond to the sensing means transistor to turn on when said sensing transistor is turned on and to turn off when said sensing transistor is turned off.

10. A method of energizing a direct current load alternatively operable at a high current level and a low current level from direct current source comprising:
energizing the load at its low current level operation from a first converter energized by the battery, and designed for efficient operation at the low level operation of the load;
sensing the current to the load with a transistor;
storing energy during the operation of the low level converter at a level sufficient to operate the transistor;
supplying said energy to the transistor upon initial operation of the load at the high current level; and
energizing the load from a second converter energized by the battery and designed for efficient operation at the high level operation of the load in response to an indication by the operation of the transistor that said load is operating at the high current level.

* * * * *